United States Patent
Poulakis

(10) Patent No.: US 9,849,616 B2
(45) Date of Patent: Dec. 26, 2017

(54) METHOD FOR PRODUCING A CONNECTING PART USING AN INJECTION FOAM MOLDING PROCESS

(71) Applicant: GOTTLIEB BINDER GMBH & CO. KG, Holzgerlingen (DE)

(72) Inventor: Konstantinos Poulakis, Hildrizhausen (DE)

(73) Assignee: GOTTLIEB BINDER GMBH & CO. KG, Holzgerlingen (DE)

( * ) Notice: Subject to any disclaimer, the term of this patent is extended or adjusted under 35 U.S.C. 154(b) by 0 days.

(21) Appl. No.: 14/786,585

(22) PCT Filed: May 20, 2014

(86) PCT No.: PCT/EP2014/001357
§ 371 (c)(1),
(2) Date: Oct. 23, 2015

(87) PCT Pub. No.: WO2014/191089
PCT Pub. Date: Dec. 4, 2014

(65) Prior Publication Data
US 2016/0067893 A1    Mar. 10, 2016

(30) Foreign Application Priority Data

May 28, 2013   (DE) .................. 10 2013 009 091

(51) Int. Cl.
*B29C 45/26*     (2006.01)
*B29C 45/00*     (2006.01)
(Continued)

(52) U.S. Cl.
CPC .......... *B29C 45/26* (2013.01); *A44B 13/0052* (2013.01); *A44B 18/008* (2013.01);
(Continued)

(58) Field of Classification Search
CPC . B29C 44/12; B29C 44/1204; B29C 44/1214; B29C 44/1219; B29C 44/1229;
(Continued)

(56) References Cited

U.S. PATENT DOCUMENTS 4,297,442 A * 10/1981 Blahak .................. C08G 18/10
                                                    521/107
4,693,921 A    9/1987 Billarant et al.
(Continued)

FOREIGN PATENT DOCUMENTS

DE    195 10 942    10/1995
DE    195 11 674    10/1995
(Continued)

OTHER PUBLICATIONS

International Search Report (ISR) dated Sep. 8, 2014 in International (PCT) Application No. PCT/EP2014/001357.

*Primary Examiner* — Stella Yi
(74) *Attorney, Agent, or Firm* — Wenderoth Lind & Ponack, L.L.P.

(57) ABSTRACT

A method for producing a connecting part (28) uses an injection foam molding process. In a first step, a fastening part with adhesive and/or hooking elements (18), forming a component of a contact fastener, is produced and introduced into an injection mold (2) as an insert part (16). A support part (26) is formed in the mold in a second step using a foamed synthetic material (22). The support part is connected to the insert part to form the connecting part (28).

11 Claims, 5 Drawing Sheets

(51) Int. Cl.
*A44B 18/00* (2006.01)
*B29C 44/12* (2006.01)
*F16B 11/00* (2006.01)
*A44B 13/00* (2006.01)
*B29C 45/14* (2006.01)
*B60N 3/04* (2006.01)
*B29L 31/00* (2006.01)
*B29K 101/12* (2006.01)
*B29K 105/04* (2006.01)
*B29K 77/00* (2006.01)
*B29K 79/00* (2006.01)

(52) U.S. Cl.
CPC ...... *A44B 18/0076* (2013.01); *B29C 44/1271* (2013.01); *B29C 45/0025* (2013.01); *B29C 45/14786* (2013.01); *B60N 3/046* (2013.01); *F16B 11/006* (2013.01); *B29K 2077/00* (2013.01); *B29K 2079/08* (2013.01); *B29K 2101/12* (2013.01); *B29K 2105/04* (2013.01); *B29L 2031/729* (2013.01)

(58) Field of Classification Search
CPC ............ B29C 44/1223; B29C 44/1233; B29C 44/1238; B29C 44/1271; B29C 44/1276; B29C 44/1285; B29C 44/129
See application file for complete search history.

(56) References Cited

U.S. PATENT DOCUMENTS

| | | |
|---|---|---|
| 4,842,916 A | 6/1989 | Ogawa et al. |
| 5,540,970 A | 7/1996 | Banfield et al. |
| 5,766,723 A | 6/1998 | Oborny et al. |
| 5,945,193 A | 8/1999 | Pollard et al. |
| 6,489,003 B1* | 12/2002 | Levitt ................ A44B 18/0049 24/442 |
| 2005/0235462 A1 | 10/2005 | Takahashi et al. |
| 2006/0110572 A1* | 5/2006 | Herrero ............. A44B 18/0049 428/100 |
| 2008/0222856 A1 | 9/2008 | Poulakis |
| 2010/0181817 A1* | 7/2010 | Tanaka ............... A44B 18/0042 297/452.48 |
| 2014/0053377 A1 | 2/2014 | Poulakis |

FOREIGN PATENT DOCUMENTS

| | | |
|---|---|---|
| DE | 196 51 675 | 6/1997 |
| DE | 696 18 762 | 10/2002 |
| DE | 10 2004 015 321 | 10/2005 |
| DE | 10 2009 054 896 | 6/2011 |
| DE | 10 2011 104 886 | 12/2012 |
| DE | 10 2013 009 091 | 12/2014 |
| EP | 0 246 221 | 11/1987 |
| EP | 0 465 983 | 1/1992 |
| EP | 1 481 603 | 12/2004 |
| WO | 98/20766 | 5/1998 |

* cited by examiner

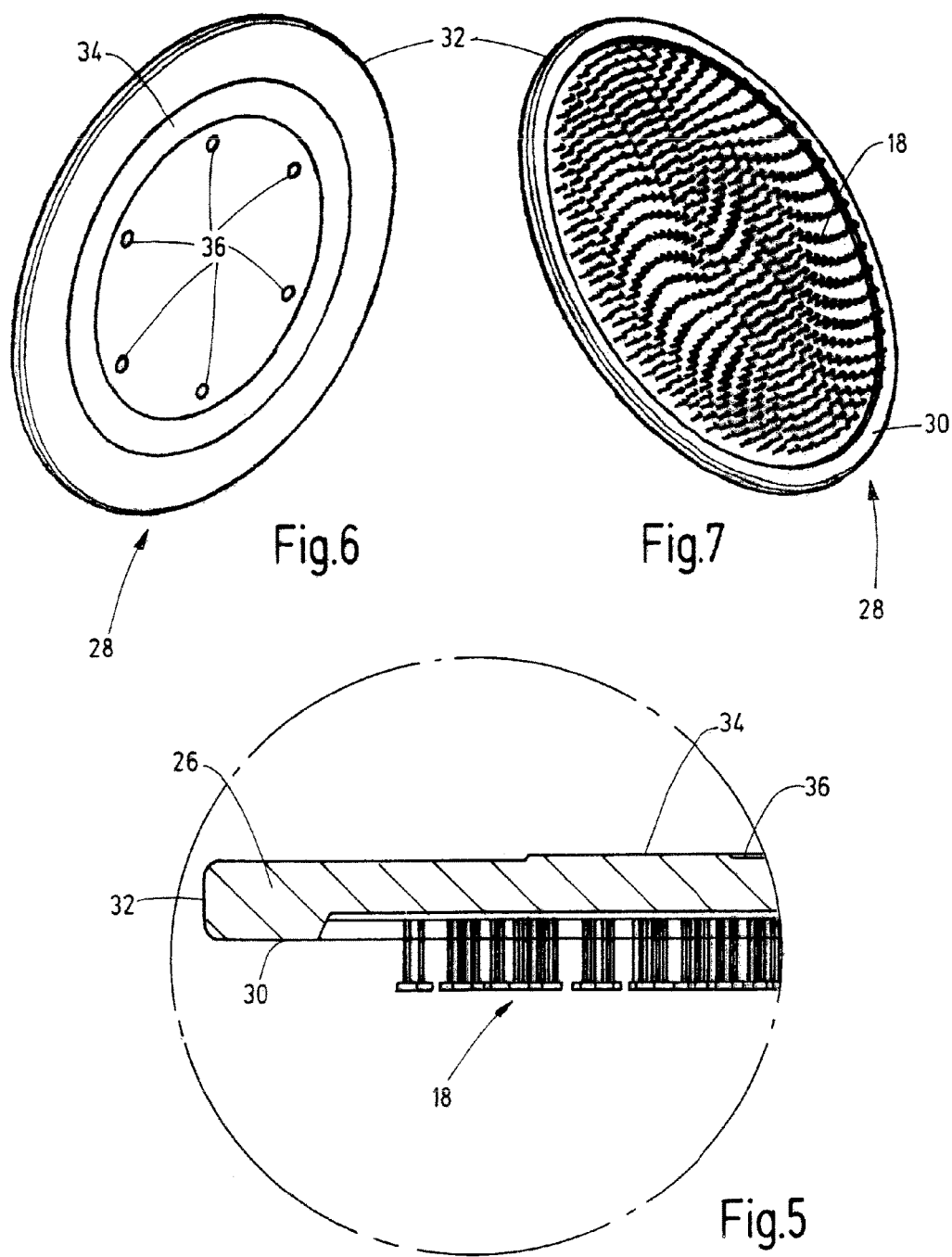

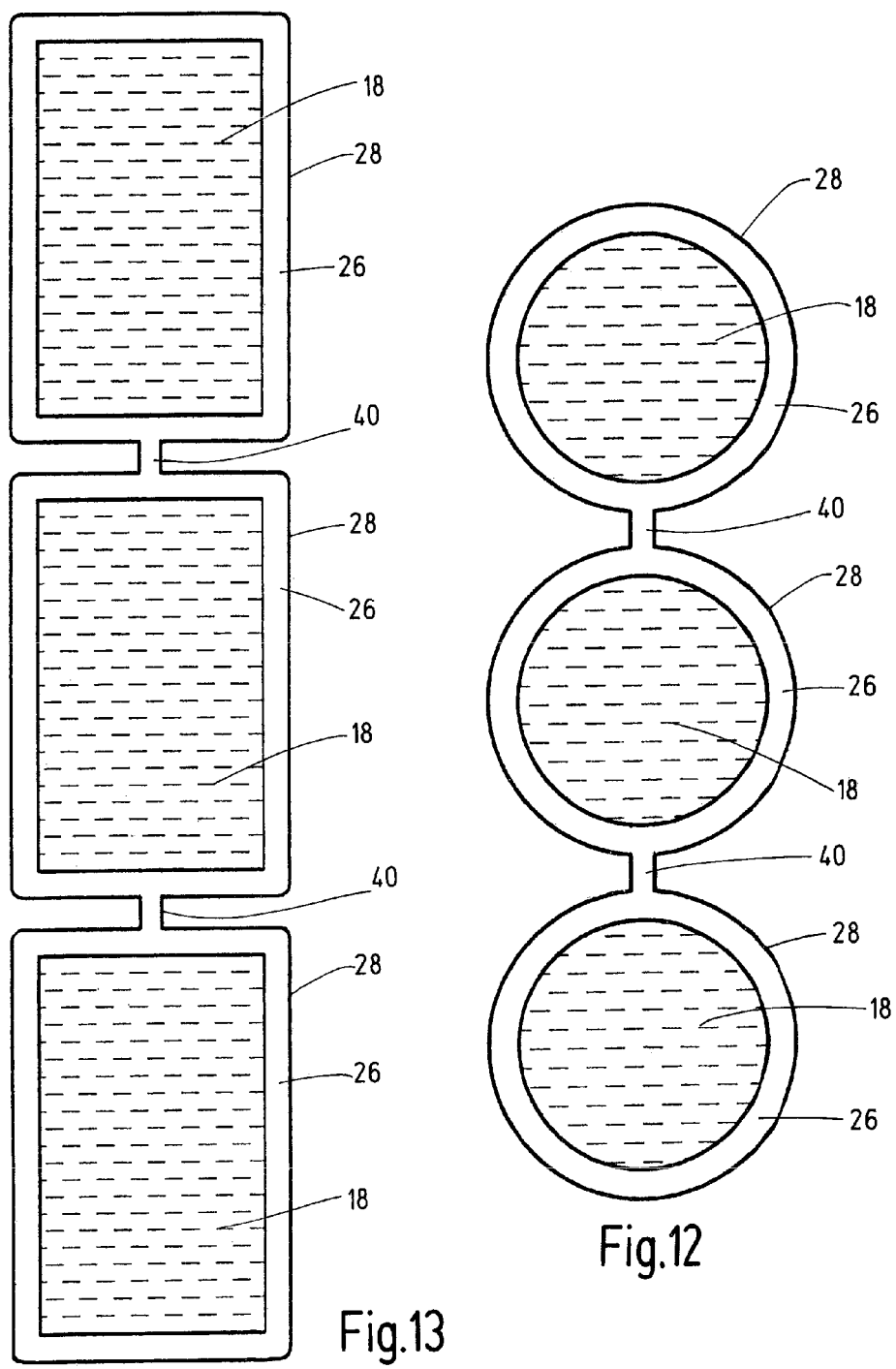

METHOD FOR PRODUCING A CONNECTING PART USING AN INJECTION FOAM MOLDING PROCESS

FIELD OF THE INVENTION

The invention relates to a method for producing a connecting part using an injection foam molding process, preferably using a synthetic material. The invention specifically relates to the production of a connecting part, which has, on one side, a fastening part having adhesive and/or hooking elements. The fastening part forms a component of a contact fastener. The connecting part may be part of a fastening system, in which system attachment parts are provided to form a contact fastener connection to a component that is to be connected. The attachment parts have adhesive and/or hooking elements, which can be releasably engaged with the corresponding adhesive and/or hooking elements of the respective connecting part.

BACKGROUND OF THE INVENTION

Contact fastener connections are used in many areas to fasten objects or components such that they can be detached again. In motor vehicles, to prevent the mats from slipping or lifting up, the mats are frequently secured to the vehicle floor in such a way that connecting parts, which are anchored to the floor, and which have adhesive and/or hooking elements, are brought into adhesive contact or interlocking engagement with attachment parts fastened to the floor mats, and having corresponding adhesive and/or hooking elements. In the prior art, the connecting parts are designed having a disk-shaped support part, which can be anchored to the vehicle floor. On the upper side of the support part, a fastening part having adhesive and/or hooking elements is attached. This attaching is done by chemical or thermal adhesive bonds, for example using adhesives or hot glues that contain solvents. Apart from the environmental impact associated with solvent-containing substances, neither the chemical, nor the thermal adhesive bonds are satisfactory. As has been shown, when used in floor mats in motor vehicles, a risk exists that the fastening part and the support part will become detached from one another when the temperature and/or the relative humidity in the vehicle is too high. Another risk is detachment when the floor mat has been used for an extended period of time. This detachment constitutes a safety risk, in particular, when the floor mat on the driver's side slides forward towards the pedals while driving. That sliding can lead to uncertainty on the part of the driver and may possibly result in an accident.

To avoid the risk that the fastening part may become detached from the support part, a solution disclosed in DE 10 2009 054 896 A1 is also prior art. According to that solution, the connecting part is produced such that the support part and hooks are simultaneously formed as fastening elements in a single process step in an injection mold. Although in this procedure, there is practically no risk of detachment, the number of hooks that can be formed in the injection mold in which the support part is molded is nevertheless extremely limited, for example to a number not exceeding 50 hooks per $cm^2$. Such a limited achievable packing density of the hooking elements is not satisfactory.

To retain the advantage of the integrated design of the support part and fastening part in a connecting part, while at the same time avoiding the disadvantages of an inadequate design of the fastening part, according to a teaching disclosed in the patent application, DE 10 2013 009 091 A1, the fastening part, with the adhesive and/or hooking elements thereof, is produced in a first step, and introduced as an insert part into an injection mold. In that mold, the connecting part in the form of a component is formed in a second step by a back injection process. The connecting part then contains the fastening part as an integrated component. A connecting part can thereby be produced, for which there is no risk of detachment due to the integrated formation of support part and fastening part, and in which the adhesive and/or hooking elements can be designed in different ways because the fastening part can be prefabricated as an insert part in a separate production process. Hooks, loops or mushroom-shaped elements having round or flat heads may also be provided and can be produced having very high packing densities using special processes provided to this end. In carrying out this method, during the back injection process, in which a molten mass made of a thermoplastic synthetic material such as polyamide or polypropylene, preferably having glass fiber reinforcement, is injected into the injection mold, the method must ensure that no damage occurs to the elements of the fastening part as a result of excessive molding pressure, such as the flattening of the adhesive or hooking elements. To eliminate this risk, a correspondingly complex design of the injection mold is necessary, for example, to avoid longer flow paths and the increased injection pressures that such a flow path requires.

SUMMARY OF THE INVENTION

An object of the invention is to provide an improved method, with which connecting parts, in which the support part contains the fastening part as an integrated component, can be efficiently and reliably produced with low equipment complexity.

This object is basically achieved by the method according to the invention having a second production step of the back injection process, in which the support part is formed through back injection of the insert part introduced into the injection mold, is carried out by injection foam molding. In this injection molding process, known in professional circles as thermoplastic injection foam molding (TSG), the polymer melt is loaded with a foaming agent, which results in the foaming of the molding material in the mold cavity after the injection molding process. As compared to compact injection molding, in the case of injection foam molding, longer flow paths can be implemented at lower process temperatures, which allow the tool to have a simplified structural design. Corresponding lower injection pressures result in lower closing forces for the mold. In addition, the risk that the adhesive and/or hooking elements might be damaged by the effects of compressive forces is reduced.

In the case of back injection by injection foam molding, the foamed support part can be designed as a damping layer. The damping layer allows use of higher injection pressures without resulting in damage to the adhesive and/or hooking elements of the insert part.

The injection foam molding can be carried out by a chemical foaming agent, which has been admixed with the base polymer, or by a physical foaming agent. The polymer melt is charged with a blowing gas. Since, in the case of chemical foaming agents, solid decomposition residues remain in the polymer melt after the separation of blowing gases, the method according to the invention is advantageously carried out in such a way that, for the foam injection molding process, at least one foaming agent is admixed with the synthetic material in a physical manner, and carbon dioxide ($CO_2$) or nitrogen ($N_2$) gas is preferably admixed with a polymer melt as a foaming agent. The polymer melt preferably comprises polyamide (PA), polypropylene (PP), polyethylene (PE) or acrylonitrile butadiene styrene (ABS).

Particularly advantageously, the method according to the invention be carried out in such a way that a coating is introduced between the insert part, also as a component thereof, and the foamed support part. The insert part is preferably provided with reaction mediator on the side of the insert part facing the support part. The reaction mediator particularly preferably contains polyurethane. During back injection, an additive of this kind promotes the formation of a firmly bonded connection of the foamed support part with the insert part. A solvent-free, moisture-curing hot-melt adhesive based on reactive polyurethane prepolymers may also serve as a reaction mediator or adhesive for producing the connection. The hot-melt adhesive contains at least one polyester polyol in a concentration between 10% and 90%, possibly polyether polyol in a concentration between 0% through 50%, as well as at least polydisocyanate in a concentration by weight between 5% and 35%.

The connecting part produced in such a manner may form a kind of semi-finished product, which is preferably connected to additional synthetic materials within the context of further injection molding. An end component is then formed. The additional synthetic materials bond solidly with the foamed support part of the connecting part.

For a particularly efficient production of end components using the connecting parts produced in accordance with the method according to the invention, advantageously the respective connecting part is separated from a plurality of connecting parts, which are produced such that they are joined together in the manner of a coil, in order that the connecting part can be further processed.

Particularly advantageously, the respective support part laterally overlaps the insert part with a predefinable projection to form a seal, and thereby forming a kind of barrier. The barrier protects the adhesive and/or hooking elements of the respective connecting part against clogging due to laterally penetrating dirt or dust particles. The connecting is being designed such that it is disk-shaped, for example.

The respective adhesive and/or hooking elements of the insert part may be formed in various ways in the manner known per se in the contact fastener technology. For example, they can be molded, woven, multi-thread knitted, single-thread knitted or crinkled. The elements may be designed such that they are hook-shaped, mushroom-shaped or loop-shaped. "Male" hooking elements may be molded elements having mushroom shapes made of polyamide or polypropylene, referred to as Mikroplast®. Woven textile elements having hooks may be elements made of polyamide or polypropylene, referred to as Klettostar®, and woven textile elements having mushroom-shaped elements, known as Pressotex®, likewise made of polyamide or polypropylene, may be provided. The textile elements may also be provided with a flame retardant. "Female" hooking elements may be woven, multi-thread knitted, single-thread knitted or crinkled as fleece, loop fabric or velour, for example as Klettostar® fleece having loops as hooking elements. Likewise, instead of hooking elements, adhesive elements that function through adhesion, so-called "gecko elements", may be provided, in which mushroom-shaped adhesive elements have planar head surfaces, which, together with planar mating surfaces, form an adhesive connection by van der Waals forces. Mushroom-shaped elements of this kind having widened heads as compared to the stems can be produced by molding processes, such as the process described in DE 198 28 856 C1, wherein, inter alia, synthetic materials such as polyamide 6, polyamide 6.6, polyamide 12, may be advantageously used. Elements provided for interlocking such as mushroom shapes without planar head surfaces or hooks, can be produced on a synthetic woven fabric or synthetic knitted fabric according to a method known in the prior art, as can be found, inter alia, from DE 10 2008 007 913 A1 for example. The fabric has projecting filaments, for example, in the form of pile threads of a single-knitted fabric. Hooks can be formed as hooking elements by cutting loops in this woven or knitted textile in two. To obtain mushroom heads, the pile threads, each of which has been cut through at the upper arch thereof, may be heated in such a way that the threads are deformed to produce mushroom heads.

The subject matter of the invention is also a connecting part, in particular a connecting part that has been produced using a method according to the method of the invention.

Other objects, advantages and salient features of the present invention will become apparent from the following detailed description, which, taken in conjunction with the drawings, discloses preferred embodiments of the present invention.

BRIEF DESCRIPTION OF THE DRAWINGS

Referring to the drawings that form a part of this disclosure:

FIG. 5 is an enlarged, partial side view in section of the area designated as V in FIG. 4;

FIGS. 6 and 7 are perspective views of the connecting part of FIG. 2 as viewed from the rear side and the front side, respectively;

FIGS. 12 and 13 are schematically simplified top views of connecting parts according to third and fourth exemplary embodiments, respectively, having differently shaped contours, which connecting parts are joined together in the manner of a coil and produced using the method according to the invention.

DETAILED DESCRIPTION OF THE INVENTION

Figure 1:
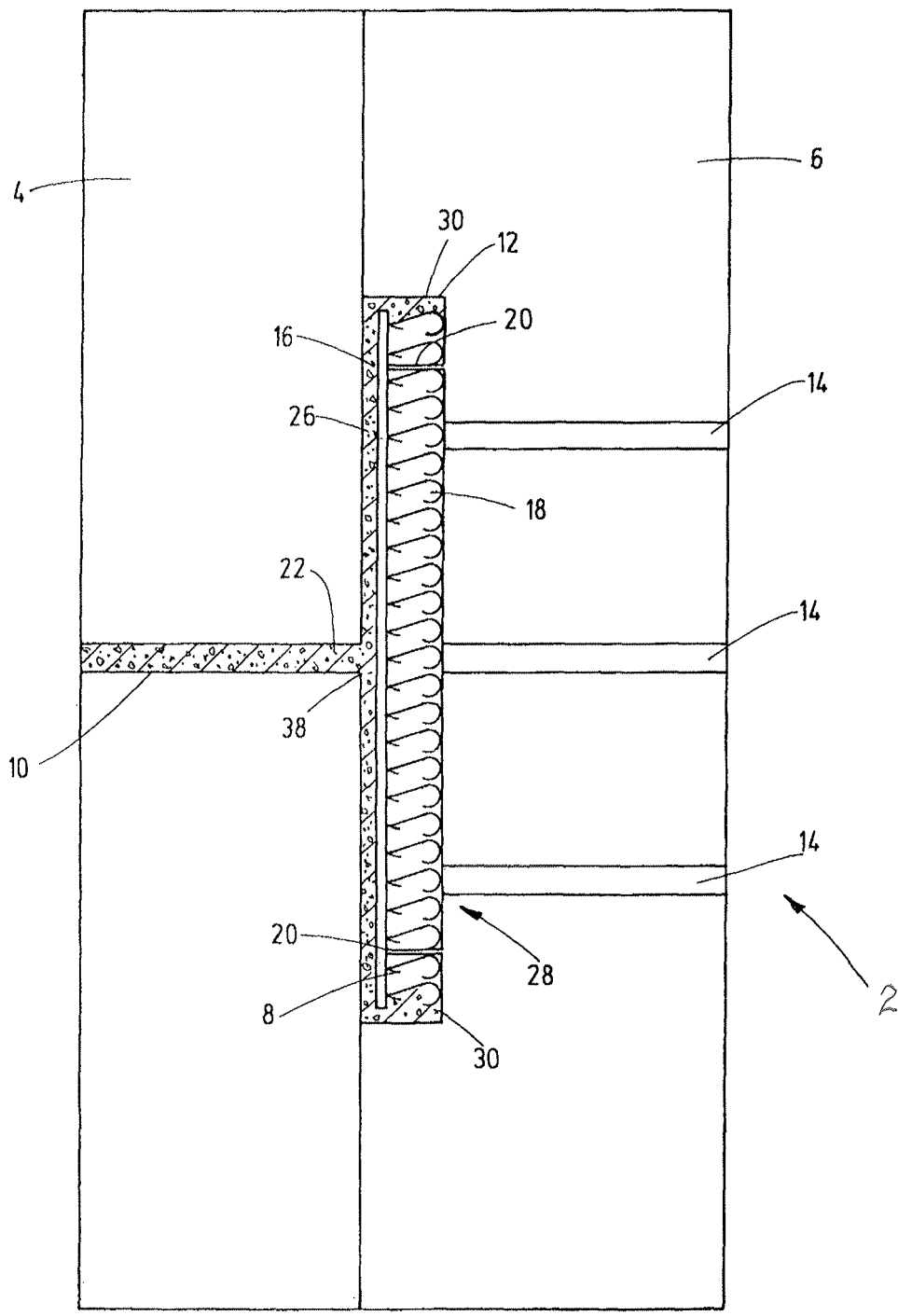
FIG. 1 is a highly schematically simplified side view in section of an injection mold for carrying out an injection foam molding process to produce a connecting part using the method according to an exemplary embodiment of the invention.
Figure 2:
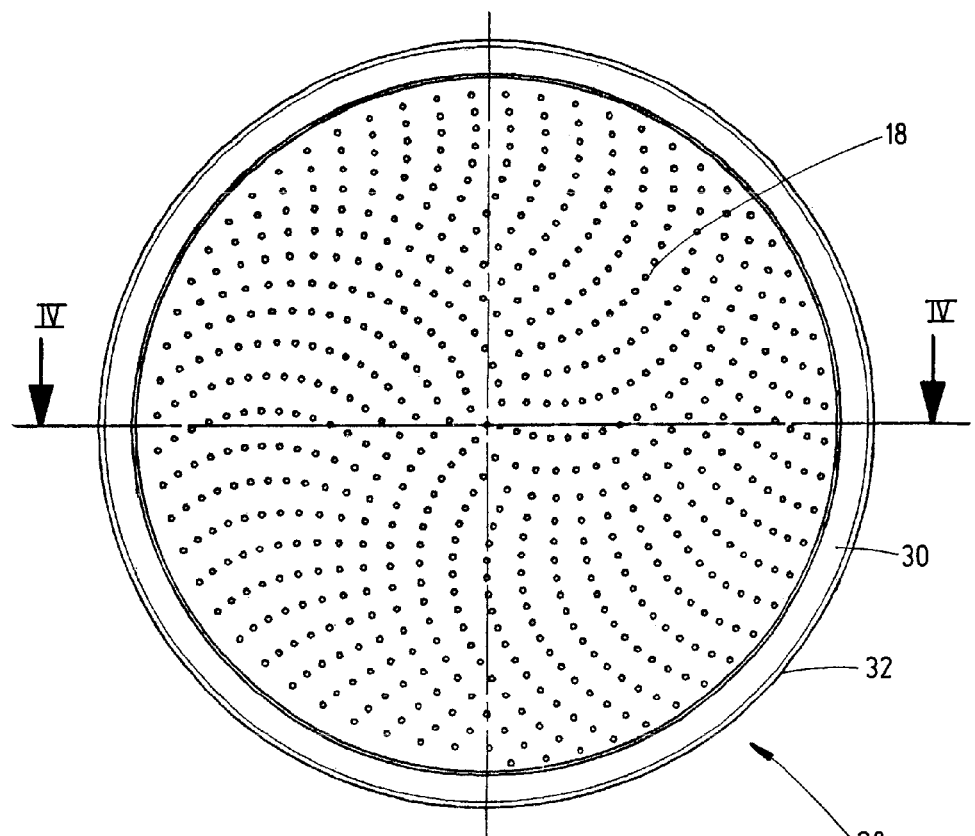
FIG. 2 is a top view of a first exemplary embodiment of a connecting part produced using the method according to the invention, wherein adhesive and/or hooking elements are indicated in a schematically simplified manner.
Figure 3:
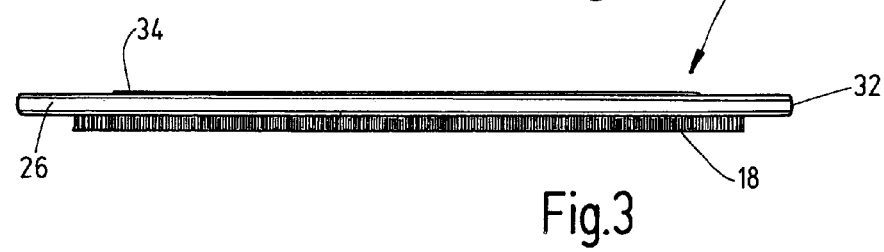
FIG. 3 is a side view of the connecting part of FIG. 2.

FIG. 1 shows a highly schematically simplified injection mold 2 in the manner of a schematic diagram. The movable mold parts 4 and 6 of the injection mold 2 delimit a mold cavity 8 in a closed position of the mold parts. From among a plurality of hot runners located in the mold part 4 for supplying the casting material, only one runner 10, is visible in FIG. 1. Air channels 14 leading into the cavity 8 are formed in the mold part 6, which is disposed opposite the mold part 4 having the runner 10. A recess 12 is formed in mold part 16 to create the cavity 8. To carry out an injection foam molding process, an insert part 16 is inserted into the recess 12. The insert part 16 forms the fastening part when the connecting part is finished. The fastening part has the adhesive and/or hooking elements. Before inserting the prefabricated insert part 16 into the injection mold 2, the side of the insert part 16 facing away from the hooking elements 18 is provided with a coating. The coating acts as a reaction mediator during the back injection process to facilitate the formation of a firmly bonded connection between the insert part 16 and foam part, which form part is formed from the polymer melt 22 supplied via respective runners 16. To this effect, as already indicated, polyurethane is preferably provided as an additive.

As shown in FIG. 1, the insert part 16 is introduced into the recess 12 in such a way that hooking elements 18 in the form of hooks, which are not shown to scale in FIG. 1 and which are merely indicated in an exaggerated height in a purely schematically simplified manner, rest against the base of the recess 12. To keep the insert part 16 on the base of the recess 12 until the conclusion of the injection molding process, suction air may be applied via the air channels 14. Spacers 20, which are not to scale and likewise depicted in an exaggerated height in FIG. 1, form a support that projects from the base of the recess 12 during the injection molding process. Similarly, pressurized supporting gas can be supplied via the air channels 14 during the molding process to protect the hooking elements 18.

Figure 4:
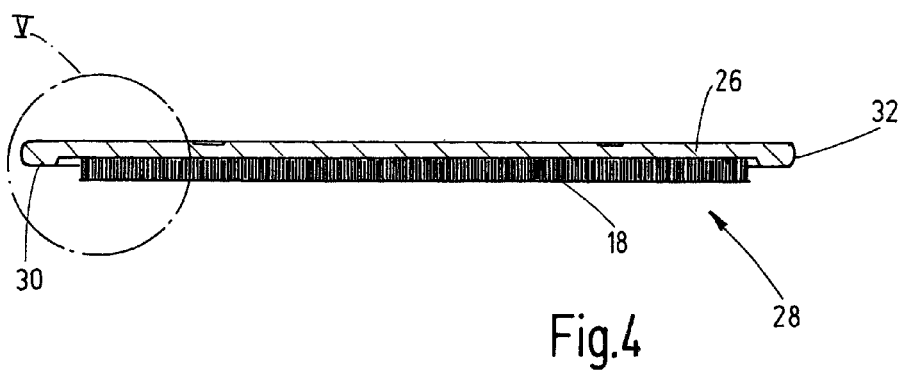
FIG. 4 is a side view in section of the connecting part taken along line IV-IV of FIG. 2.

FIG. 1 shows the status after the injection of the polymer melt 22, which has been foamed via a foaming agent, in the present case by a blowing gas, preferably carbon dioxide or nitrogen gas. The insert part 16 is back injected by the foamed polymer melt 22 in such a way that a foamed support part 26 is formed and is connected to the insert part 16 in a firmly bonded manner. A connecting part 28 in the form of an integrated component is then formed. The connecting part comprises the support part 26 with the integrated fastening part with the hooking elements 18. As shown in FIG. 1, the support part 26 overlaps the insert part 16 with a lateral projection 30 (see also FIGS. 4 and 5). Upon completion of the back injection process carried out in the injection foam molding process and the opening of the mold parts 4, 6, the process of giving a final shape to the connecting part 28 can be implemented or supported using blowing air supplied via the air channels 14.

FIGS. 2 through 7 show the connecting part 28, which has been removed from the injection mold 2 after the back injection process. The connecting part has the shape of a flat, round disk. This disk comprises the support part 26, which is formed as a foam body from the foamed polymer melt 22. The hooking elements 18 are integrated with the support part. The hooking elements are provided in a mushroom shape, for example, and are depicted in the drawings in a merely schematically simplified manner and not to scale.

The hooking elements 18 extend as a circular surface area up to the projection 30 enclosing the elements. The projection extends along the outer circumference 32. The rear surface of the connecting part 28 facing away from the hooking elements 18 is not completely planar, as is most clearly evident from FIG. 6, which shows the rear surface. As shown, an annular ridge 34 is formed, which ridge extends concentrically, spaced radially apart from the outer circumference 32. As is evident from the enlarged depiction in FIG. 5 ridge 34, has a very small projection within the range of a tenth of a millimeter or less, with a planar outer side. The sprue points at the outlets 38 of the hot runners 10 (FIG. 1) are visible within the annular ridge 34 as surface marks 36. Corresponding to the arrangement of the hot runners 10, the surface marks 36 are located in the mold part 4 of the injection mold 2 along a circular line, which circular line extends concentrically within the annular ridge 34, spaced a short distance radially apart.

As shown in FIG. 12, a plurality of connecting parts 28 can be produced by a multi-part injection mold, which is not depicted. The connecting parts are joined together via projections of the support parts 26 and form a "coil". For further processing to produce an end component 42, as depicted in FIGS. 8 through 11, the connecting parts 28 can be separated from one another at the projections 40 thereof, and can efficiently be made available for further processing. FIG. 13 shows the design of a corresponding coil, wherein, instead of connecting parts 28 having a circular contour, connecting parts 28 having a rectangular contour are provided.

Figure 8:
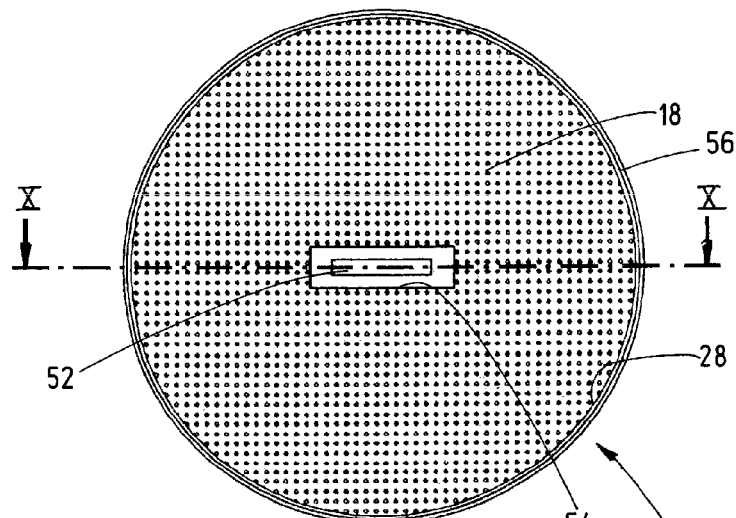
FIG. 8 is a top view of an end component, provided with a second exemplary embodiment of a connecting part produced using the method according to the invention.
Figure 9:
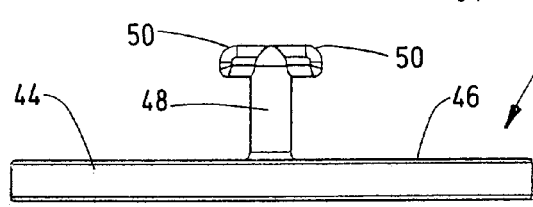
FIG. 9 is a side view of the end component of FIG. 8.

The end component 42 contains the connecting part 28 as a component of a fastening system. An object, such as a mat can be fastened to a floor structure by a contact fastener connection having the shape of a round connection disk. The shape can be seen most clearly in FIGS. 9 and 10. The connection disk has a base body 44 made of a synthetic material, which bonds solidly with the foamed support part 26 of the connecting part 28 during an injection molding process, for example a further back injection process. The disk-shaped base body 44 has an integrally formed anchoring stud 48 on the underside 46 facing a supporting structure, not depicted here. At the free end of anchoring stud 48, anchoring catches 50 project laterally and diametrically opposite to one another. On the upper side of the base body 44, on which the connecting part 28 is located, a recessed depression 52 is molded in the central region that is aligned with the stud 48. This depression facilitates the rotation of the base body 44 when said body is anchored to a supporting structure as a result of the stud 48 being inserted through a slot opening and then being turned. A rectangular cutout 54 is formed in the central region in the connecting part 28 provided for the connection to the base body 44, as shown in FIGS. 8 and 10, which cutout extends continuously through the hooking elements 18 and the support part 26 so that the depression 52 in the base body is accessible 44.

Figure 10:
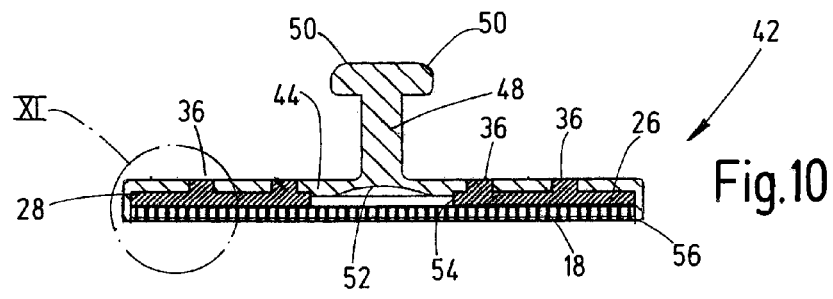
FIG. 10 is a side view in section of the end component corresponding to the section line X-X of FIG. 8.
Figure 11:
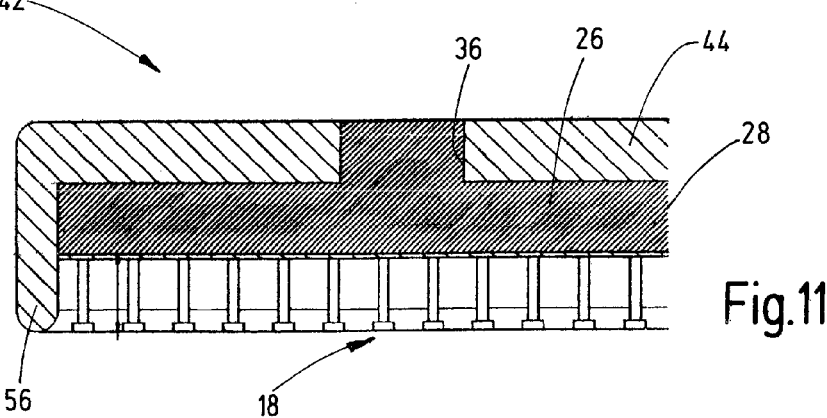
FIG. 11 is an enlarged, partial side view in section of the area in FIG. 10 designated as XI.

During the injection molding process, in which the connecting part 28 is connected to the upper side of the base body 44, a raised outer edge 56 is formed on the base body 44, as is shown more clearly in FIG. 10 and FIG. 11. The height of the outer edge 56 may be selected such that it is higher than the outer edge of the adjoining hooking elements 18 of the connecting part 28. In this way, the elements can be protected against damage both from above, and from the side and, as viewed from the front side of the base body 44 and are fully accessible to mesh or engage with a corresponding fastening material, for example in the form of loop material, located on the respective object that is to be mounted. When the hooking elements 18 in question are "gecko" elements for forming an adhesive connection, then the outer edge 56 is formed such that it does not project above the hooking elements 18 or at most, projects only slightly thereabove, as shown in FIG. 11.

The foamed synthetic material has a softening and melting temperature that is comparable to that of the synthetic material of the fastening part. In this way, the synthetic materials of the fastening part, together with the foamed synthetic material within the mold, form a common molten mass. After the cooling, the fastening part is connected to the foam in a firmly bonded manner. As such, the melting temperature of polyethylene falls within a range of approximately 110° through 135° Celsius, that of polypropylene within a range of 160° through 170° Celsius, and possible polyamide materials melt in a temperature range of between 170° and 260° Celsius. Polyethylene terephthalate (PET), on the other hand, has a very high melting point of 250° through 260° Celsius. By selecting the ideal pairings of materials with the melting temperatures thereof, it is possible to produce the firmly bonded connection after cooling via a common molten pool.

While various embodiments have been chosen to illustrate the invention, it will be understood by those skilled in the art that various changes and modifications can be made therein without departing from the scope of the invention as defined in the claims.

The invention claimed is:

1. A method for producing a connecting part, comprising the steps of:
   providing a fastening part forming a component of a contact fastener and having at least one of adhesive elements or hooking elements;
   introducing the fastening part as an insert part into an injection mold having air channels such that the at least one of adhesive elements or hooking elements face and are exposed to the air channels; and
   producing the connecting part by injection foam molding in the interior of the injection mold in which a support part is formed by a foamed synthetic material and is connected to the insert part on a side of the insert part remote from the at least one of adhesive elements or hooking elements to form the connecting part, while at least one of suction air or a pressurized supporting gas is supplied via the air channels.

2. The method according to claim 1, wherein the support part forms a dampening layer to allow higher injection pressures without causing damage to the at least one of adhesive elements or the hooking elements of the fastening parts.

3. The method according to claim 1, wherein
   for the injection foam molding, at least one foaming agent is admixed with the foamed synthetic material in a physical manner; and
   at least one of carbon dioxide or nitrogen gas is admixed as the at least one foaming agent of a polymer melt comprising polyamide, polypropylene, polyethylene or acrylonitrile butadiene styrene.

4. The method according to claim 1, wherein a coating is introduced between the insert part and the support part.

5. The method according to claim 4, wherein the coating is a reaction mediator provided on a side of the insert part facing the support part.

6. The method according to claim 5, wherein the reaction mediator contains polyurethane.

7. The method according to claim 1, wherein the connecting part forms a semi-finished product and is connected to another synthetic material in a further injection molding to form an end component, the other synthetic material is bonded solidly with the support part of the connecting part.

8. The method according to claim 1, wherein a plurality of connecting parts connected to one another are formed and are joined to one another in a coil, the plurality of connecting parts are separated from one another for further processing.

9. The method according to claim 1, wherein the support part overlaps the insert part with a projection forming a seal.

10. The method according to claim 1, wherein the connecting part is disk-shaped.

11. The method according to claim 1, wherein the elements of the insert parts are at least one of molded, woven, multi-thread knitted, single-thread knitted or crinkled; and the at least one of adhesive elements or hooking elements are at least one of hook-shaped, mushroom-shaped or loop-shaped.

* * * * *